United States Patent
Jeong

(10) Patent No.: US 10,696,142 B2
(45) Date of Patent: Jun. 30, 2020

(54) ROTATING SHAFT ASSEMBLY HAVING DEPLOYABLE SCREW THREAD AND CLUTCH FOR AIR CONDITIONER COMPRESSOR HAVING THE SAME

(71) Applicants: Hyundai Motor Company, Seoul (KR); Kia Motors Corporation, Seoul (KR)

(72) Inventor: Seong-Bin Jeong, Gyeonggi-do (KR)

(73) Assignees: HYundai Motor Company, Seoul (KR); Kia Motors Corporation, Seoul (KR)

( * ) Notice: Subject to any disclaimer, the term of this patent is extended or adjusted under 35 U.S.C. 154(b) by 319 days.

(21) Appl. No.: 15/837,630

(22) Filed: Dec. 11, 2017

(65) Prior Publication Data

US 2019/0084377 A1 Mar. 21, 2019

(30) Foreign Application Priority Data

Sep. 21, 2017 (KR) .................. 10-2017-0121921

(51) Int. Cl.
*B60H 1/32* (2006.01)
*F16H 25/24* (2006.01)
*F16D 27/102* (2006.01)
*F16D 27/108* (2006.01)
*F16D 41/06* (2006.01)

(52) U.S. Cl.
CPC ......... *B60H 1/3222* (2013.01); *F16D 27/102* (2013.01); *F16D 27/108* (2013.01); *F16D 41/06* (2013.01); *F16H 25/24* (2013.01); *F16H 25/2454* (2013.01)

(58) Field of Classification Search
CPC ... B60H 1/3222; F16H 25/24; F16H 25/2454; F16D 27/14; F16D 27/102; F16D 27/108; F16D 27/105; F16D 27/11; F16D 27/118; F16D 41/16; F16D 41/06; F16D 41/084; F16D 41/12; F16D 41/125
See application file for complete search history.

(56) References Cited

U.S. PATENT DOCUMENTS

| | | | |
|---|---|---|---|
| 6,739,440 B1 * | 5/2004 | Dick | F16D 41/16 192/39 |
| 8,276,725 B2 * | 10/2012 | Swales | F16D 27/118 192/43.1 |
| 8,607,808 B1 * | 12/2013 | You | A45B 25/22 135/25.33 |
| 9,702,330 B2 * | 7/2017 | Winkler | B60H 1/0045 |

(Continued)

FOREIGN PATENT DOCUMENTS

KR 10-1204942 B1 11/2012

*Primary Examiner* — Jeremy R Severson
(74) *Attorney, Agent, or Firm* — Mintz Levin Cohn Ferris Glovsky and Popeo, P.C.; Peter F. Corless

(57) ABSTRACT

A rotating shaft assembly having a deployable screw thread is provided. The rotating shaft assembly includes a rotating shaft which transmits rotational force, and a plurality of screw units that are slidable in a longitudinal direction of the rotating shaft. A plurality of deployable portions are moved away from the rotating shaft when the deployable portions are pressed from one side by a pressing device. Additionally, the deployable portions are deployed outward when the screw units are pressed by the pressing device that moves along the rotating shaft.

20 Claims, 21 Drawing Sheets

(56) References Cited

U.S. PATENT DOCUMENTS 10,183,566 B2 * 1/2019 Trent ................ B60K 6/387
2009/0194381 A1 * 8/2009 Samie ................ B60K 6/383
                                                 192/43.2

* cited by examiner

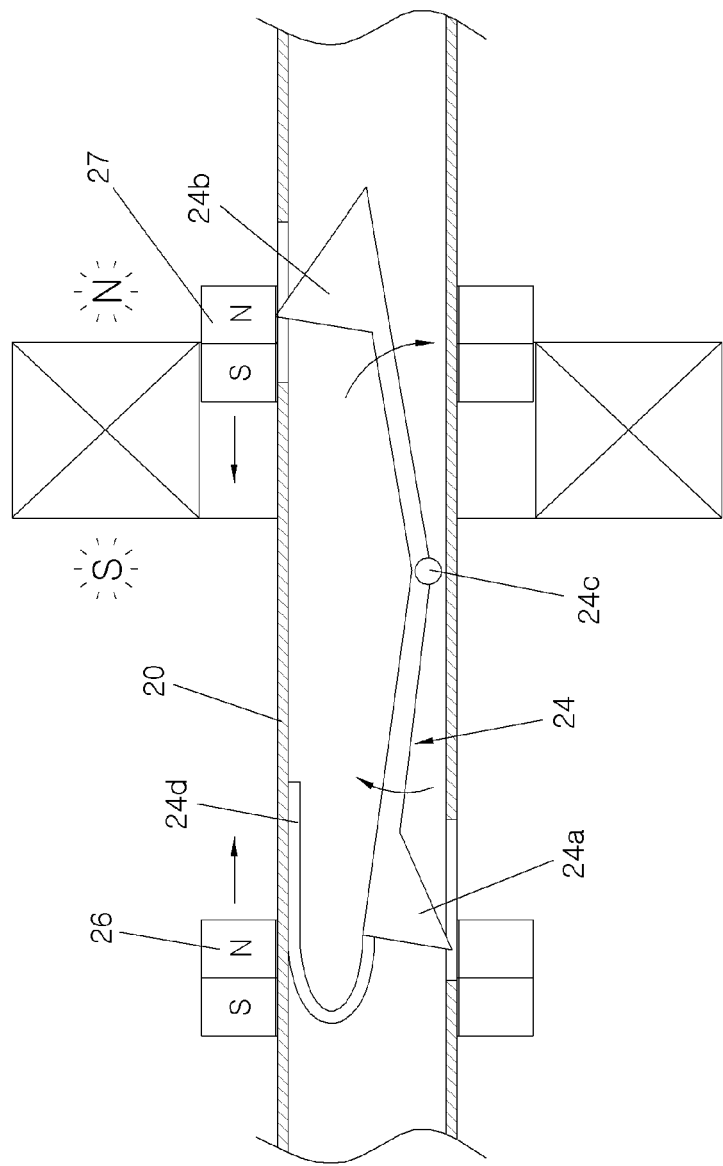

ROTATING SHAFT ASSEMBLY HAVING DEPLOYABLE SCREW THREAD AND CLUTCH FOR AIR CONDITIONER COMPRESSOR HAVING THE SAME

CROSS-REFERENCE TO RELATED APPLICATIONS

This application claims priority to Korean Patent Application No. 10-2017-0121921, filed on Sep. 21, 2017, which is incorporated herein by reference in its entirety.

BACKGROUND

Field of the Invention

The present invention relates to an air conditioner compressor which is used to intermittently supply power of an engine to a compressor that compresses a refrigerant in a vehicle, and more particularly, to a rotating shaft assembly having a deployable screw thread and a clutch for an air conditioner compressor having the same, in which electric current is supplied to a coil while the clutch is connected or disconnected, and a screw thread is deployed outward to transmit power when the clutch is connected.

Description of Related Art

In an engine compartment of a vehicle, an air conditioner compressor, an alternator, a water pump, and the like are operated by being supplied with driving power of the engine. The air conditioner compressor is also operated by being supplied with the driving power of the engine, and the air conditioner compressor is not always operated, but operated when the air conditioner is operated. Accordingly, a clutch is applied such that the driving power of the engine is input when the driving power of the engine is required.

FIGS. 1 and 2 illustrate a clutch for an air conditioner compressor in the related art. FIG. 1 illustrates a state in which an air conditioner is not operated, and driving power of the engine 101 is input to a driven pulley 112 through a driving pulley 111 and a belt 114. However, the driven pulley 112 is not directly connected to a rotating shaft 115 of a compressor 102, and as a result, the compressor 102 is not operated. A disc 117 is fastened to an end portion of the rotating shaft 115 through a hub 116, and the disc 117 is not in contact with the driven pulley 112. A rubber 119 and a ring 118 are disposed outside the disc 117.

When an operation of the air conditioner is required as an occupant engages an air conditioner operation switch or a temperature reaches a preset temperature, electric power is applied to a coil 113. When the electric power is applied to the coil 113, the disc 117 moves toward the driven pulley 112, and the disc 117 and the driven pulley 112 come into friction contact with each other, as illustrated in FIG. 2. Therefore, driving power of the engine 101 is transmitted to the compressor 102 through the driving pulley 111, the belt 114, the driven pulley 112, the disc 117, the hub 116, and the rotating shaft 115, and thus, the compressor 102 is operated.

However, in the clutch for an air conditioner compressor in the related art, separate electric power needs to be continuously applied to transmit power. In other words, electric power needs to be applied to the coil 113 to maintain the state in which the driven pulley 112 and the disc 117 are in contact with each other. This power is not used to operate the compressor 102, and as a result, fuel economy of the vehicle deteriorates to that extent.

SUMMARY

The present invention provides a clutch for an air conditioner compressor, in which electric power is consumed when driving power of the engine is connected to or disconnected from the air conditioner compressor, and no electric power is required when the clutch is engaged or disengaged. Another object of the present invention provides a rotating shaft having a deployable screw thread which is deployed outward to engage a pulley with the rotating shaft when power is transmitted.

To achieve the aforementioned objects, a rotating shaft assembly having a deployable screw thread according to the present invention may include: a rotating shaft that transmits rotational force; and a plurality of screw units be slidable in a longitudinal direction of the rotating shaft, and may include deployable portions that are moved away from the rotating shaft when the deployable portions are pressed from one side by a pressing device, in which the deployable portions may be deployed outward when the screw units are pressed by the pressing device that moves along the rotating shaft.

The screw unit may further include: a connecting portion that slides along the rotating shaft; and a plurality of sliders disposed at predetermined intervals along a circumference of the connecting portion and each may have a front end to which a rear end of the deployable portion is hingedly connected, and when the screw units are pressed by the pressing device, a rear end of the slider of any one screw unit may push a front end of the deployable portion of another screw unit adjacent to one screw unit at a rear side to deploy the deployable portion.

The sliders, disposed along the circumference of the connecting portion, may be connected to the connecting portion at different positions in a longitudinal direction of the sliders. The plurality of screw units may be disposed in the longitudinal direction of the rotating shaft, and the front end of any one deployable portion may abut against the rear end of the slider of another adjacent screw unit. The plurality of screw units may be disposed in the longitudinal direction of the rotating shaft, the adjacent screw units may be disposed to thus dispose the deployable portions at a predetermined angle interval, and when all of the deployable portions are deployed, an imaginary line, which connects end portions of the deployable portions, may be a spiral line.

A guide groove may be formed in an outer surface of the rotating shaft in the longitudinal direction of the rotating shaft, and a guide protrusion, inserted into the guide groove, may be formed on an inner surface of the connecting portion. A spring may be disposed at a side of the rotating shaft opposite to the pressing device, may elastically support the screw units to allow the screw units to return back to an initial position, and may be wound outside the rotating shaft. The pressing device may be a magnet installed to be movable along the rotating shaft, and may be configured to compress the screw units while moving along the rotating shaft when a magnetic field is applied.

Meanwhile, a clutch for an air conditioner compressor having a rotating shaft assembly having a deployable screw thread according to the present invention may include: a pulley to which rotational force is input from an engine; an air conditioner compressor configured to compress a refrigerant when the rotational force is input from the pulley; a rotating shaft assembly having a rotating shaft configured to transmit the rotational force to the compressor, and a plurality of screw units slidable in a longitudinal direction of the rotating shaft and that may include deployable portions spaced apart from the rotating shaft; a coil installed in the compressor to surround the rotating shaft and magnetized when electric power is applied to operate the compressor; and a first magnet installed to be slidable along the rotating shaft and configured to compress the screw units when the coil is magnetized, in which a fastening groove for accommodating the deployed rotating shaft assembly may be formed in the pulley, and when the coil is magnetized, the first magnet may be configured to compress the screw units to deploy the deployable portions, and insert the screw units into the fastening groove to fasten the pulley and the rotating shaft assembly, and thus, the rotational force may be transmitted from the pulley to the compressor.

The screw unit may further include: a connecting portion that slides along the rotating shaft; and a plurality of sliders disposed at predetermined intervals along a circumference of the connecting portion and each may have a front end to which a rear end of the deployable portion is hingedly connected, and when the screw units are pressed by the first magnet, a rear end of the slider of any one screw unit may push a front end of the deployable portion of another screw unit adjacent to one screw at a rear side to deploy the deployable portion, to fasten the deployable portions to the fastening groove.

The sliders, disposed along the circumference of the connecting portion, may be connected to the connecting portion at different positions in a longitudinal direction of the sliders. The plurality of screw units may be disposed in the longitudinal direction of the rotating shaft, the adjacent screw units may be disposed to dispose the deployable portions at a predetermined angle interval, an imaginary line, which connects end portions of the deployable portions, may be a spiral line when all of the deployable portions are deployed, and the rotating shaft assembly may be fastened to the fastening groove of the pulley by a threaded engagement.

A guide groove may be formed in an outer surface of the rotating shaft in the longitudinal direction of the rotating shaft, and a guide protrusion, inserted into the guide groove, may be formed on an inner surface of the connecting portion. A spring may be installed in the fastening groove to be wound outside the rotating shaft when a first end of the spring is supported inside the fastening groove, and a second end of the spring may support the screw units in a direction in which the screw units are restored.

The rotating shaft may be formed as a hollow shaft, and a screw thread retaining hook may be installed in the rotating shaft to support the first magnet and prevent the first magnet from being moved backward when the first magnet slides to compress the screw units. The screw thread retaining hook may include: a catching protrusion inserted into the rotating shaft when the first magnet slides by the coil along the rotating shaft to compress the screw units, the catching protrusion remaining in a state of protruding from the rotating shaft in the opposite direction to maintain a state in which the first magnet compresses the screw units; a rotating pin formed at a portion that extends from the catching protrusion and allows the screw thread retaining hook to rotate in the rotating shaft; and an elastic portion that extends from the catching protrusion opposite to the rotating pin and elastically supports the catching protrusion so that the catching protrusion protrudes from the rotating shaft.

A releasing protrusion, which rotates the catching protrusion to insert the catching protrusion into the rotating shaft when the air conditioner is requested to be stopped, may be formed on the screw thread retaining hook at a side opposite to the catching protrusion based on the rotating pin. The clutch may further include a second magnet, which slides along the rotating shaft to press the releasing protrusion to insert the releasing protrusion into the rotating shaft when the air conditioner is requested to be stopped, may be formed on the rotating shaft at a side opposite to the first magnet based on the coil. The second magnet may be disposed to have the same polarity as the first magnet.

When the air conditioner is requested to be stopped, electric current may be applied to the coil in a direction opposite to a direction in which electric current is applied to deploy the screw units, the second magnet may be configured to move toward the first magnet to push the releasing protrusion and rotate the screw thread retaining hook, the catching protrusion may be accommodated in the rotating shaft, and the first magnet may be folded in an initial state.

According to the rotating shaft assembly having the deployable screw thread and the clutch for an air conditioner compressor having the same of the present invention which are configured as described above, electric power may be applied to the coil when the clutch is engaged and disengaged, and it is not necessary to apply electric power to the coil, after the clutch is engaged or disengaged, to maintain the engaged or disengaged state.

It is not necessary to apply electric power to the coil after the clutch is engaged or disengaged, such that a minimal amount of power is required to apply electric power, and as a result, it may be possible to improve fuel economy of the vehicle. In addition, it may be possible to maintain the engaged state by allowing the rotating shaft to be deployed when power is transmitted, and as a result, it is not necessary to separately apply electric power when the clutch is engaged.

BRIEF DESCRIPTION OF THE DRAWINGS

The above and other objects, features and other advantages of the present invention will be more clearly understood from the following detailed description when taken in conjunction with the accompanying drawings, in which:

FIGS. 12A to 12B are cross-sectional views illustrating states of the screw thread retaining hook while the clutch is engaged in the clutch for an air conditioner compressor having the rotating shaft assembly having the deployable screw thread according to an exemplary embodiment of the present invention.

DETAILED DESCRIPTION

Figure 1:
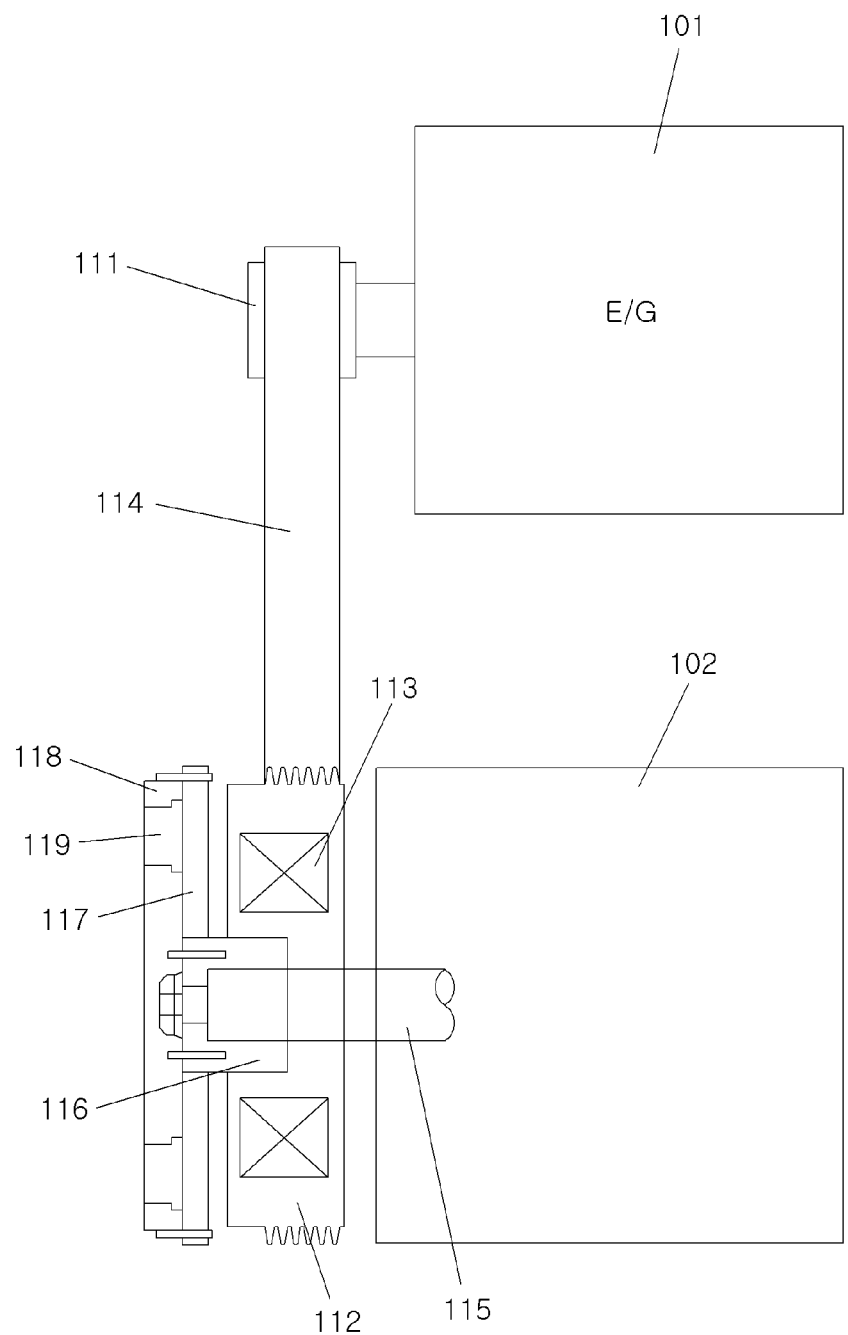
FIG. 1 is a schematic view illustrating a state of a clutch for an air conditioner compressor in the related art when an air conditioner is not operated.
Figure 2:
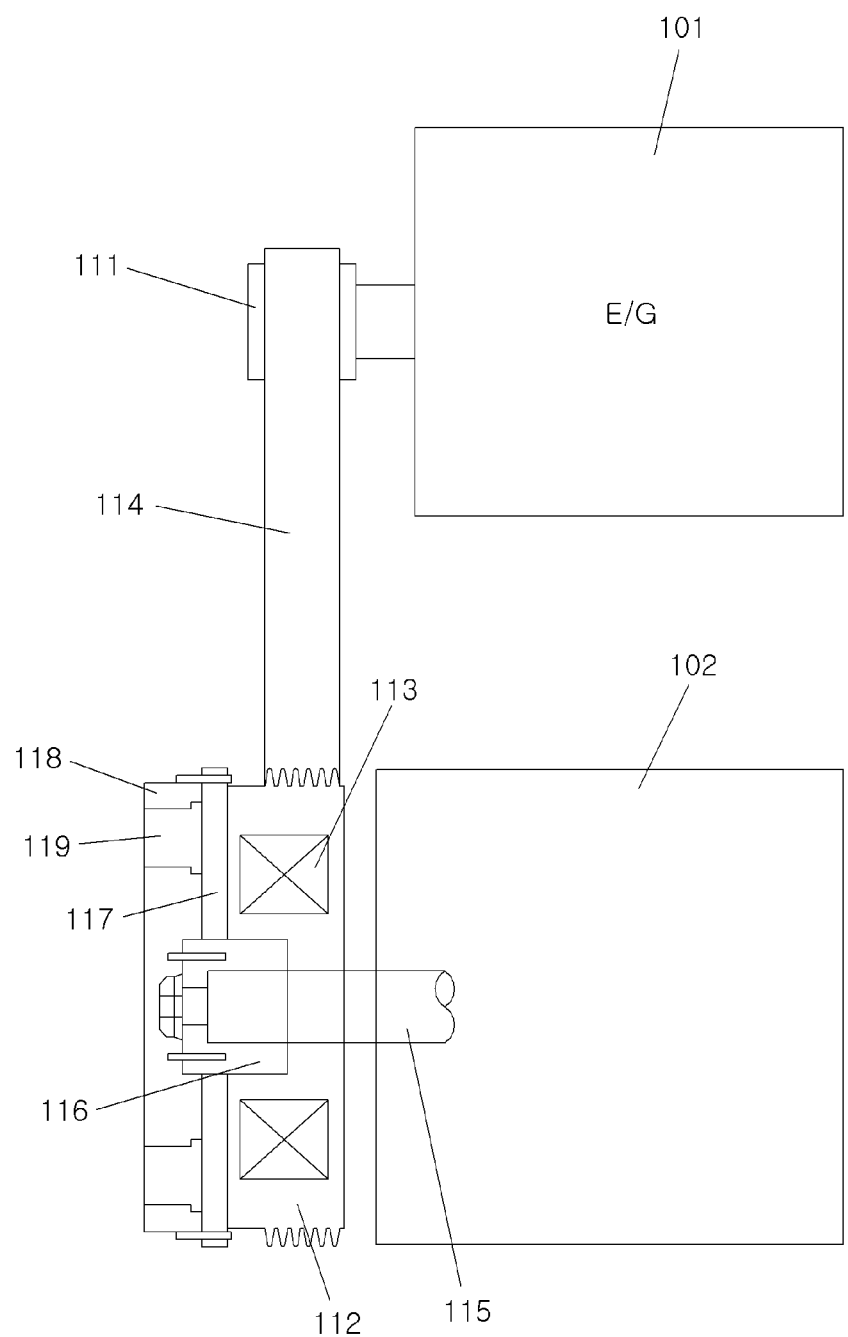
FIG. 2 is a schematic view illustrating a state of the clutch for an air conditioner compressor in the related art when the air conditioner is operated.
Figure 3:
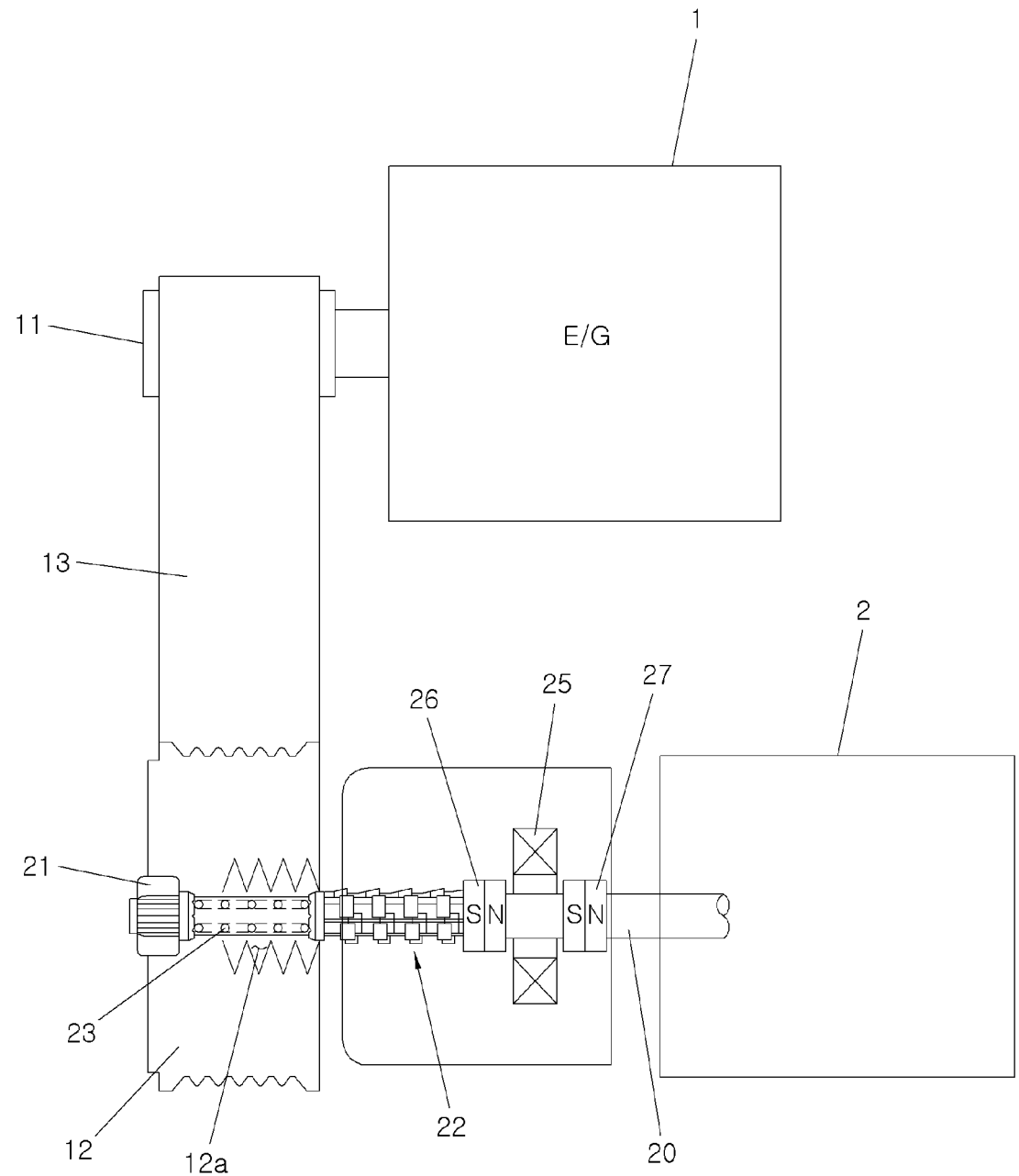
FIG. 3 is a schematic view illustrating a clutch for an air conditioner compressor having a rotating shaft assembly having a deployable screw thread according to an exemplary embodiment of the present invention.
Figure 4:
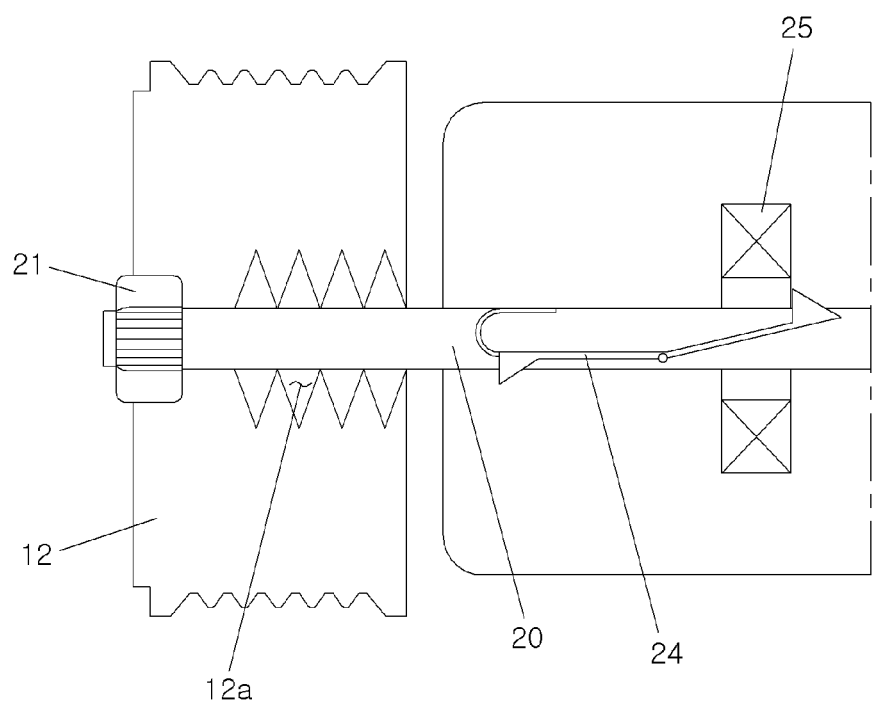
FIG. 4 is a schematic view illustrating a screw thread retaining hook in the clutch for an air conditioner compressor having the rotating shaft assembly having the deployable screw thread according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, a clutch for an air conditioner compressor having a rotating shaft assembly having a deployable screw thread according to the present invention will be described in detail with reference to the accompanying drawings.

In the rotating shaft assembly having the deployable screw thread according to the present invention, a plurality of screw units 22, which have deployable portions 22b that are deployable outward from a rotating shaft 20, may be installed in a longitudinal direction of the rotating shaft 20 at an outer circumference of the rotating shaft 20 configured to transmit rotational force of an engine, input from a driven pulley 12 to which rotational force is input from a driving pulley 11 being rotated by the engine 1, to an air conditioner compressor 2. The deployable portions 22b may be deployed to form a screw thread outside the rotating shaft assembly when the deployable portions 22b are moved to be close to one another, and a diameter of the rotating shaft assembly may be decreased when the deployable portions 22b are moved away from one another, and thus, the rotating shaft assembly may be extended or retracted.

Figure 5A:
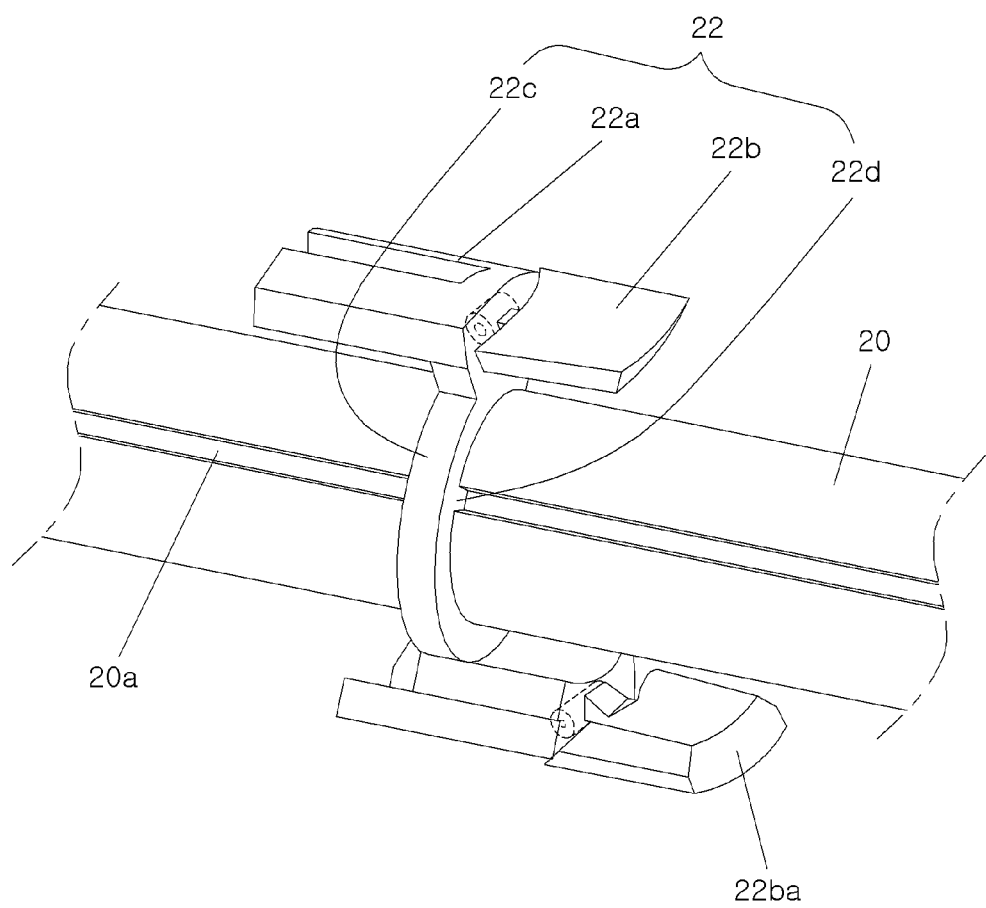
FIGS. 5A and 5B are perspective views illustrating states before and after a screw unit is deployed in the clutch for an air conditioner compressor having the rotating shaft assembly having the deployable screw thread according to an exemplary embodiment of the present invention.
Figure 5B:
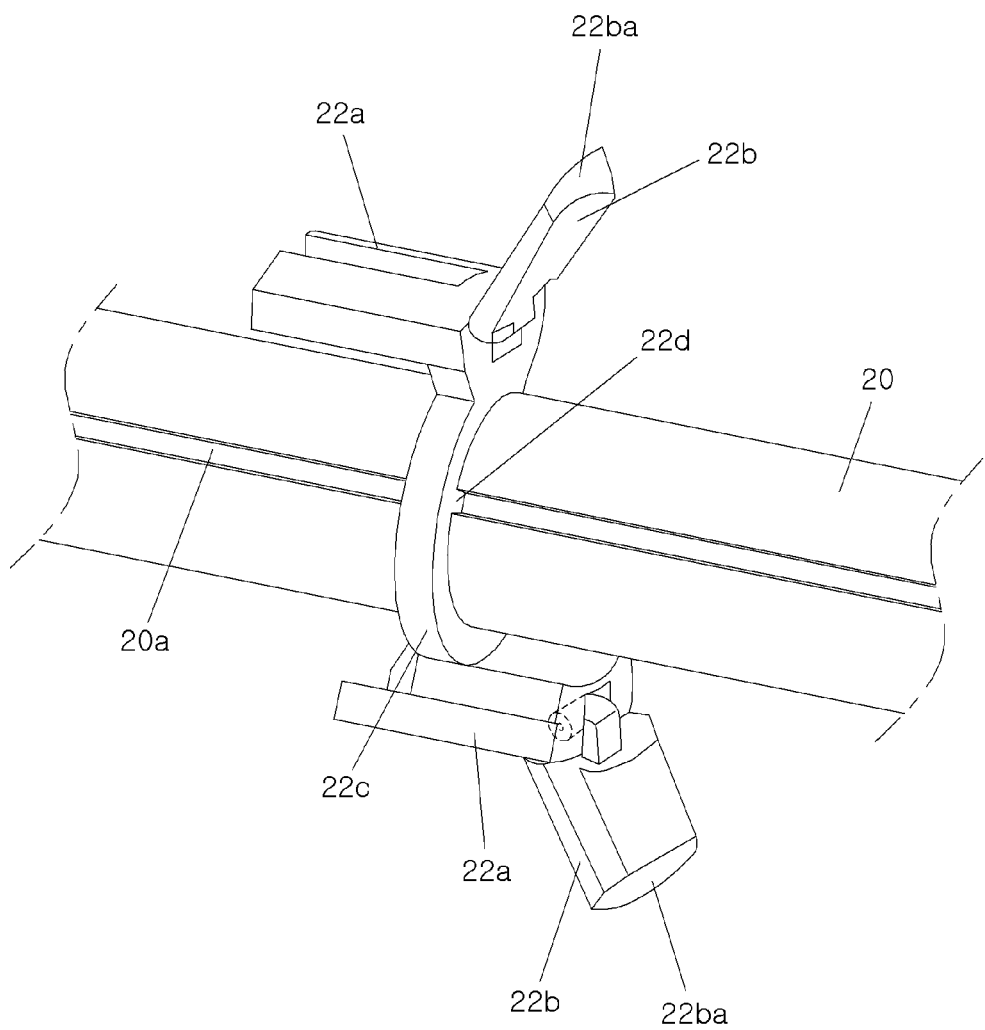

As illustrated in FIGS. 5A and 5B, the screw unit 22 may include a slider 22a that slides along the rotating shaft 20, the deployable portion 22b hingedly connected to the slider 22a and deployed outward from the rotating shaft 20, and a connecting portion 22c that guides the slider 22a, so that the slider 22a is slidable with respect to the rotating shaft 20, and connects the slider 22a in a circumferential direction of the rotating shaft 20.

The slider 22a may be disposed on an outer surface of the rotating shaft 20 to be slidable in the longitudinal direction of the rotating shaft 20. The slider 22a may be formed in the form of a block, and may be configured to slide in the longitudinal direction of the rotating shaft 20. The plurality of sliders 22a may be disposed along the circumference of the rotating shaft 20, and the sliders 22a may be connected by the connecting portion 22c to be described below.

The deployable portion 22b may be hingedly connected to a front end of the slider 22a. A rear end of the deployable portion 22b may be hingedly connected to the front end of the slider 22a. When the rotating shaft assembly transmits power (e.g., the air conditioner is operated), the deployable portion 22b may be deployed and thus, a front end of the deployable portion 22b may be moved away from the rotating shaft 20. When the power transmission is not required (e.g., the air conditioner is not operated), the deployable portion 22b may be restored and thus, the front end of the deployable portion 22b may be moved to be close to the rotating shaft 20.

In particular, the front end of the deployable portion 22b may be formed as an inclined surface 22ba, and thus, the deployable portion 22b may be deployed more easily when the deployable portion 22b is pressed by the slider 22a. The connecting portion 22c may be formed in a shape that surrounds the rotating shaft 20, for example, may be formed in the form of a ring. The sliders 22a may be installed at an interval on the connecting portion 22c. The plurality of the sliders 22a may be installed at an equal interval on the connecting portion 22c. For example, an interval between the sliders 22a is 180 degrees when the two sliders 22a are installed on the single connecting portion 22c (see FIG. 5A), and an interval between the sliders 22a is 120 degrees when the three sliders 22a are installed on the single connecting portion 22c.

Meanwhile, when the sliders 22a are installed along the circumference of the connecting portion 22c, the sliders 22a may be connected to the connecting portion 22c at different positions in the longitudinal direction of the sliders 22a. In other words, under the assumption that the two sliders 22a are installed on the connecting portion 22c, a front end of any one slider 22a (slider positioned at the upper side in FIG. 5B) may be connected to the connecting portion 22c, and a rear end of the other slider 22a may be connected to the connecting portion 22c.

A protrusion-groove structure may be applied between the connecting portion 22c and the rotating shaft 20 to move the connecting portion 22c in the longitudinal direction of the rotating shaft 20 without being rotated along the rotating shaft 20. For example, a guide groove 20a may be formed in the rotating shaft 20 in the longitudinal direction of the rotating shaft 20, and a guide protrusion 22d, inserted into the guide groove 20a, may be formed on an inner surface of the connecting portion 22c.

Figure 6:
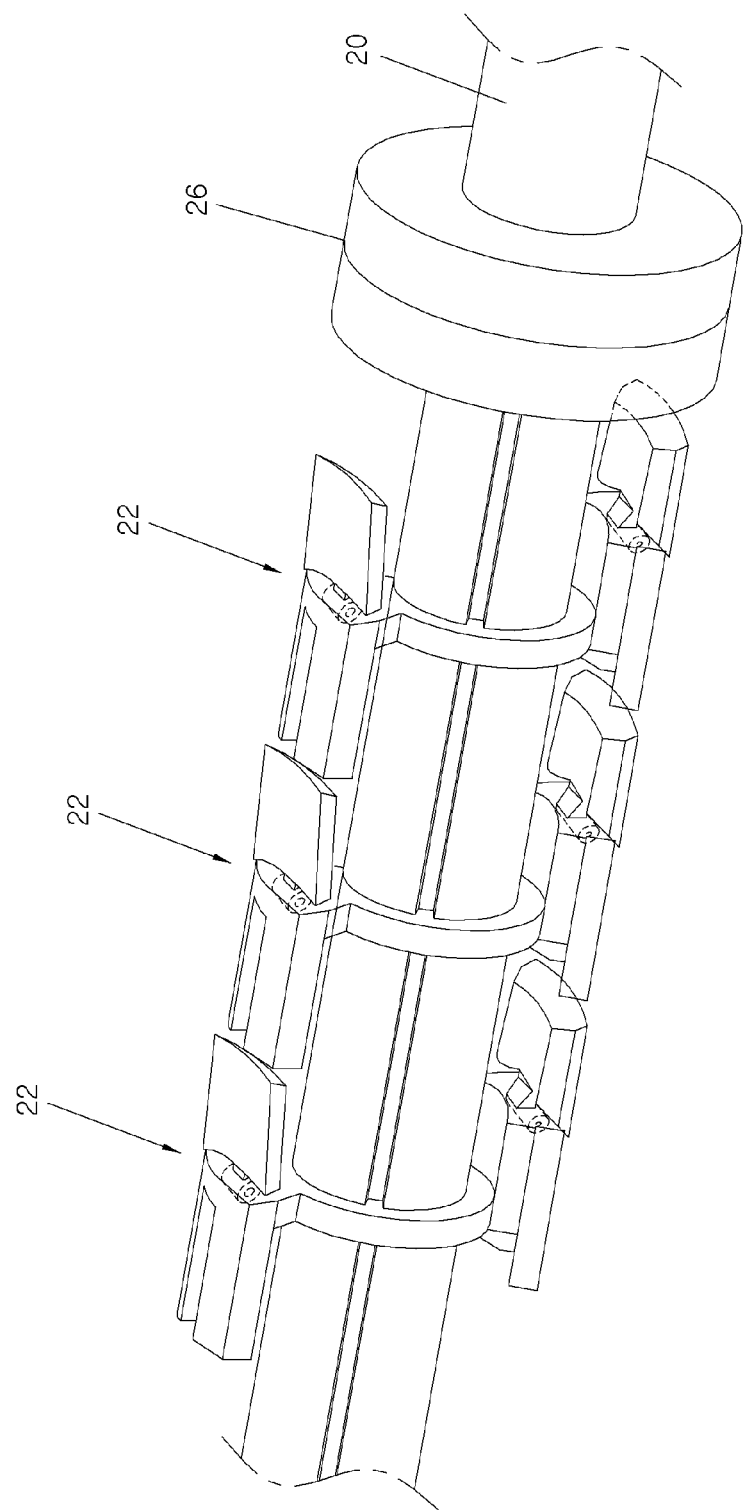
FIG. 6 is a perspective view illustrating a state in which a plurality of screw units is installed in a longitudinal direction on a rotating shaft in the clutch for an air conditioner compressor having the rotating shaft assembly having the deployable screw thread according to an exemplary embodiment of the present invention

As illustrated in FIG. 6, the plurality of screw units 22, each of which may include the sliders 22a, the deployable portions 22b, and the connecting portion 22c, may be disposed on the rotating shaft 20 in the longitudinal direction. In particular, the deployable portions 22b of the respective screw units 22 may be folded, and thus, the front end of the deployable portion 22b of any one screw unit 22 may abut against the rear end of the slider 22a of another screw unit 22 positioned adjacent to one screw unit 22 in front of one screw unit 22.

When external force is applied to the screw units 22 in an axial direction of the rotating shaft 20 in the state in which the plurality of screw units 22 is disposed in the longitudinal direction of the rotating shaft 20 as described above, the screw units 22 may be compressed while the deployable portions 22b are deployed. When external force is applied to the screw units 22, the slider 22a of the screw unit 22 at the front side may enter the inclined surface 22ba formed at the front end of the deployable portion 22b, thereby deploying the deployable portion 22b. As this operation is performed in series, all of the deployable portions 22b are deployed and thus, the front ends of the deployable portions 22b may be moved away from the rotating shaft 20.

Figure 7:
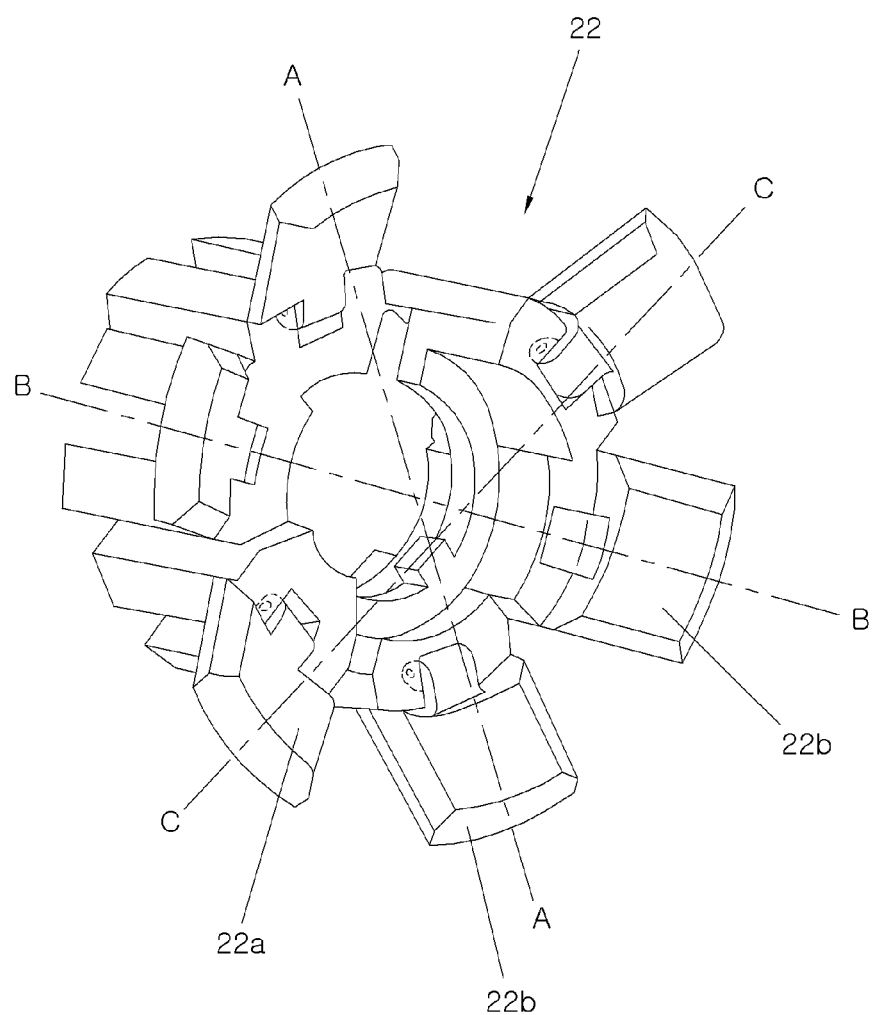
FIG. 7 is a perspective view illustrating a state in which a plurality of screw units is installed in a circumferential direction in the clutch for an air conditioner compressor having the rotating shaft assembly having the deployable screw thread according to an exemplary embodiment of the present invention.

In addition, as illustrated in FIG. 7, the screw units 22 may be disposed to position the deployable portions 22b at predetermined angles in the circumferential direction of the rotating shaft 20. In other words, the screw units 22 may be disposed such that the sliders 22a and the deployable portions 22b are disposed at predetermined angles with respect to the other adjacent screw units 22. For example, FIG. 7 illustrates an example in which the deployable portions 22b of the screw units 22 are disposed at an interval of about 120 degrees, and the deployable portions 22b of the screw units 22 may be disposed on a line A-A, a line B-B, and a line C-C. In particular, the adjacent different screw units 22 may be arranged in the longitudinal direction of the rotating shaft 20.

Since the screw units 22 are disposed in the circumferential direction of the rotating shaft 20 as described above, an imaginary line, which connects the deployable portions 22b, is a spiral line. In other words, an imaginary line, which connects the deployable portions 22b positioned on the line A-A, the deployable portions 22b positioned on the line B-B, and the deployable portions 22b positioned on the line C-C, is a spiral line.

Figure 8A:
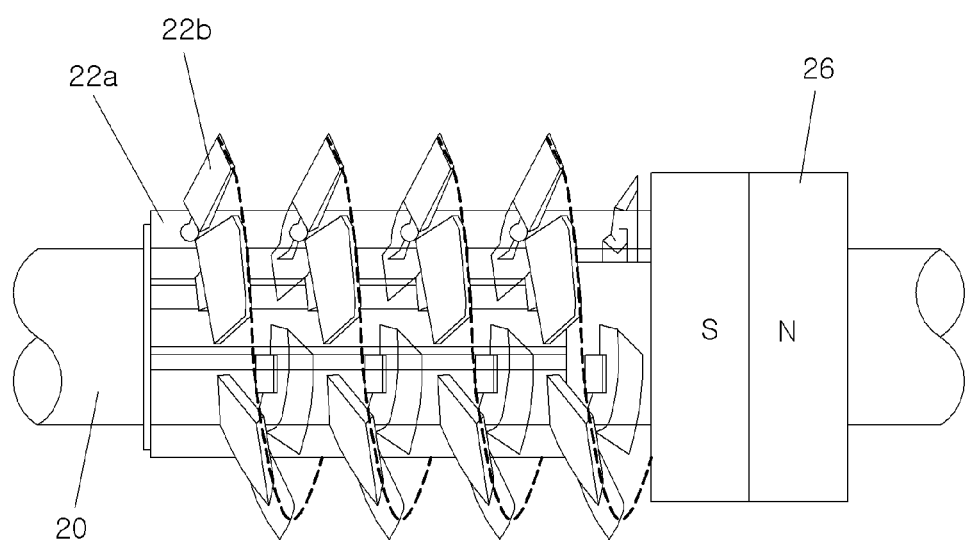
FIGS. 8A and 8B are side views illustrating a state in which a plurality of screw units is installed in the longitudinal direction and the circumferential direction on a rotating shaft in the clutch for an air conditioner compressor having the rotating shaft assembly having the deployable screw thread according to an exemplary embodiment of the present invention.
Figure 8B:
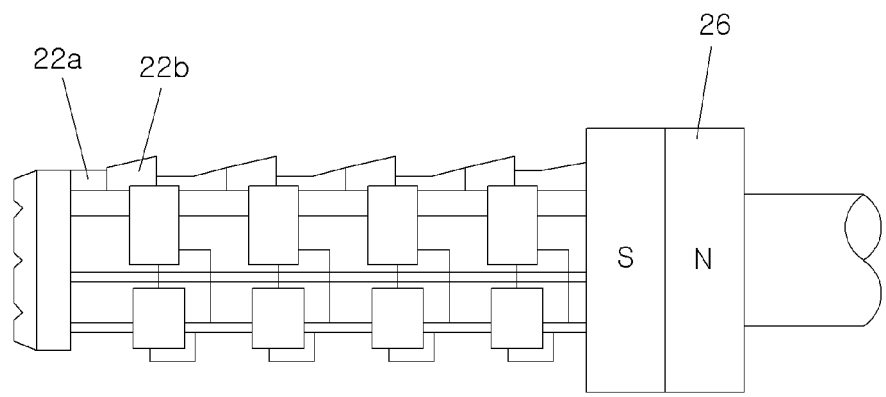

Further, the screw units 22 may be disposed in the circumferential direction of the rotating shaft 20 and the longitudinal direction of the rotating shaft 20, thereby defining a form as illustrated in FIG. 8A. In other words, the screw units 22 may be continuously disposed in the longitudinal direction of the rotating shaft 20 as well as in the circumferential direction of the rotating shaft 20, and thus, when the screw units 22 are compressed by a compressor such as a first magnet 26 to be described below, all of the deployable portions 22b may be deployed, and as a result, a screw thread may be formed outside the rotating shaft assembly (see FIG. 8B).

The screw thread may be formed outside the rotating shaft assembly as described above, and thus, when the screw thread meshes with the driven pulley 12 in the deployed state in which the screw thread is formed outside the rotating shaft assembly, power may be transmitted from the driven pulley 12 to the compressor 2, and as a result, the air conditioner may be operated. In other words, a fastening groove 12a may be formed in the driven pulley 12 to mesh with the deployed deployable portions 22b when the rotating shaft assembly is deployed, and thus, when the rotating shaft assembly in the deployed state enters the fastening groove 12a, the rotating shaft assembly and the driven pulley 12 may be fastened to each other.

An elastic member, that is, a spring 23, which separates the screw units 22 from the driven pulley 12, may be installed at a first side of the rotating shaft 20 of the rotating shaft assembly. In particular, the spring 23 may be installed at an end portion of the rotating shaft assembly at the driven pulley 12 side to surround the rotating shaft 20, thereby elastically supporting the screw units 22 from a hub 21 in a direction in which the screw units 22 are discharged from the fastening groove 12a. A coil 25 may be magnetized when electric power is applied to the coil 25. The coil 25 may be formed in the form of a ring, and the rotating shaft 20 penetrates the interior of the coil 25.

The first magnet 26 may be positioned between the coil 25 and the driven pulley 12. The first magnet 26 allows attractive force or repulsive force to be applied between the coil 25 and the first magnet 26 when the coil 25 magnetized. In other words, the attractive force or the repulsive force may be applied between the coil 25 and the first magnet 26 in accordance with a direction of electric current applied to the coil 25. The deployable portions 22b of the screw units 22 are deployed when the repulsive force is applied, and the deployable portions 22b may return back to the original position when the attractive force is applied.

A second magnet 27 may be positioned opposite to the first magnet 26 based on the coil 25. The second magnet 27 may also allow attractive force or repulsive force to be applied between the coil 25 and the second magnet 27 based on a direction of electric current applied to the coil 25. When the attractive force is applied between the coil 25 and the second magnet 27, the screw units 22 may return back to the original state, that is, the state in which the deployable portions 22b of the screw units 22 are folded. When the repulsive force is applied between the coil 25 and the second magnet 27, the second magnet 27 is about to move away from the coil 25, but the second magnet 27 does not move due to being caught by a housing of the compressor 2.

The first magnet 26 and the second magnet 27 may be disposed in the same direction. In particular, when an S pole of the first magnet 26 is disposed adjacent to the driven pulley 12 and an N pole of the first magnet 26 is disposed opposite to the S pole, an S pole of the second magnet 27 may also be disposed adjacent to the driven pulley 12, and an N pole of the second magnet 27 may be disposed opposite to the S pole. A screw thread retaining hook 24 may be installed to be inserted into the rotating shaft 20 which is a hollow shaft. The screw thread retaining hook 24 enables the screw units 22 to remain deployed when the air conditioner is operated, and the screw thread retaining hook 24 enables the deployable portions 22b of the screw units 22 to be folded when the air conditioner is requested to be stopped.

The screw thread retaining hook 24 allows the screw units 22 to remain deployed by restricting the movement of the first magnet 26, and the screw thread retaining hook 24 enables the screw unit 22 to be folded when the first magnet 26 is movable. In other words, when the air conditioner is operated and the screw units 22 are deployed as the first magnet 26 compresses the deployable portions 22b and the sliders 22a, the screw thread retaining hook 24 prevents the first magnet 26 from being moved backward, thus allowing the screw units 22 to remain deployed. In addition, when the air conditioner is requested to be stopped, the screw thread retaining hook 24 enables the first magnet 26 to be moved, and thus, the screw units 22 may be folded.

A specific configuration of the screw thread retaining hook 24 will be described. The screw thread retaining hook 24 may include a catching protrusion 24a which prevents the first magnet 26 from sliding toward the coil 25 to maintain the state in which the first magnet 26 deploys the deployable portions 22b of the screw units 22, and a releasing protrusion 24b configured to release the first magnet 26 from the catching protrusion 24a to allow the first magnet 26 to slide on the rotating shaft 20. The catching protrusion 24a and the releasing protrusion 24b may be connected to each other, and a rotating pin 24c may be formed between the catching protrusion 24a and the releasing protrusion 24b.

The catching protrusion 24a may have a stopping surface formed at a side directed toward the screw units 22 and perpendicular to the longitudinal direction of the rotating shaft 20, and an inclined surface formed opposite to the stopping surface. A first part of the catching protrusion 24a may be positioned in the rotating shaft 20, and a second part of the catching protrusion 24a may be exposed to the outside of the rotating shaft 20, and thus, the movement of the first magnet 26 may be restricted. In other words, when the catching protrusion 24a is exposed to the outside, the first magnet 26 may be moved toward the driven pulley 12, and the first magnet 26 may be restricted from moving in the opposite direction. When the entire catching protrusion 24a is inserted into the rotating shaft 20, the first magnet 26 may slide in both directions on the rotating shaft 20.

The releasing protrusion 24b may have an inclined surface formed opposite to the driven pulley 12 (at the right side in the drawings). When the second magnet 27 passes over the releasing protrusion 24b, the releasing protrusion 24b may be inserted into the rotating shaft 20, and thus, the catching protrusion 24a may be configured to release the first magnet 26. An elastic portion 24d may be formed to extend to an end portion of the screw thread retaining hook 24, for example, a first side of the catching protrusion 24a. The elastic portion 24d may be installed to be elastically supported on an inner surface of the rotating shaft 20, and may allow the screw thread retaining hook 24 to return back to the initial state (e.g., state in which the catching protrusion is exposed to the outside of the rotating shaft).

Figure 9A:
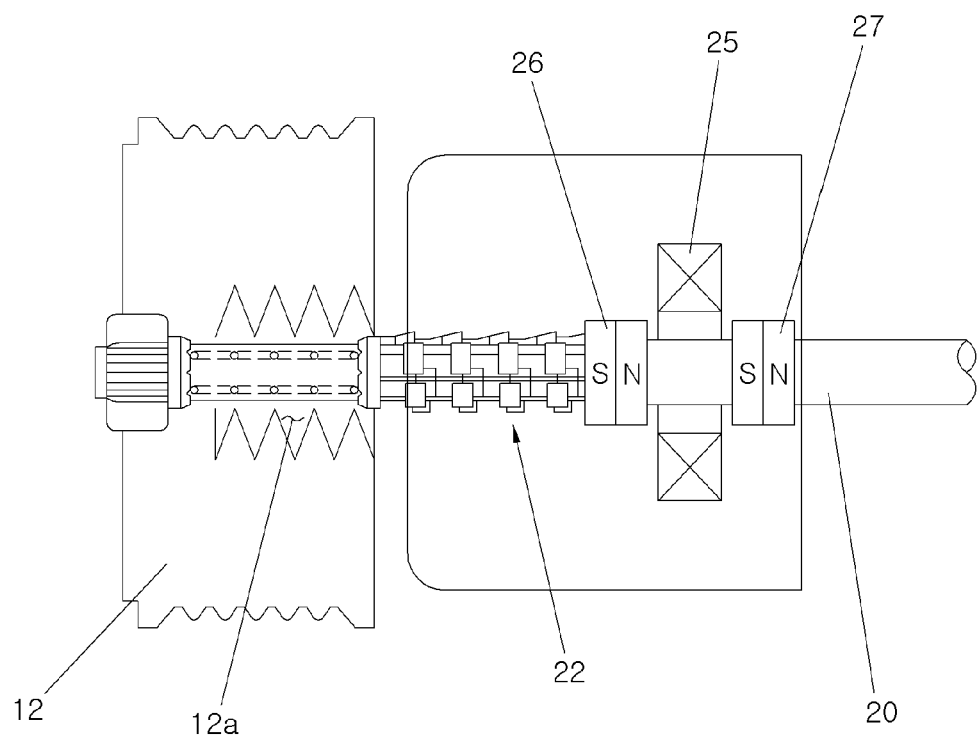
FIGS. 9A to 9C are schematic views illustrating a process in which the clutch for an air conditioner compressor having the rotating shaft assembly having the deployable screw thread according to an exemplary embodiment of the present invention is engaged.
Figure 9B:
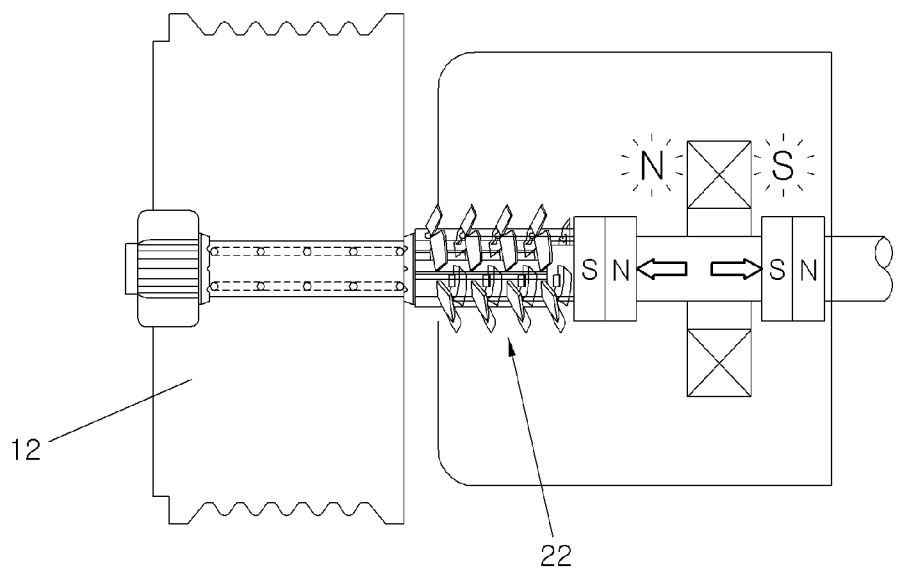
Figure 9C:
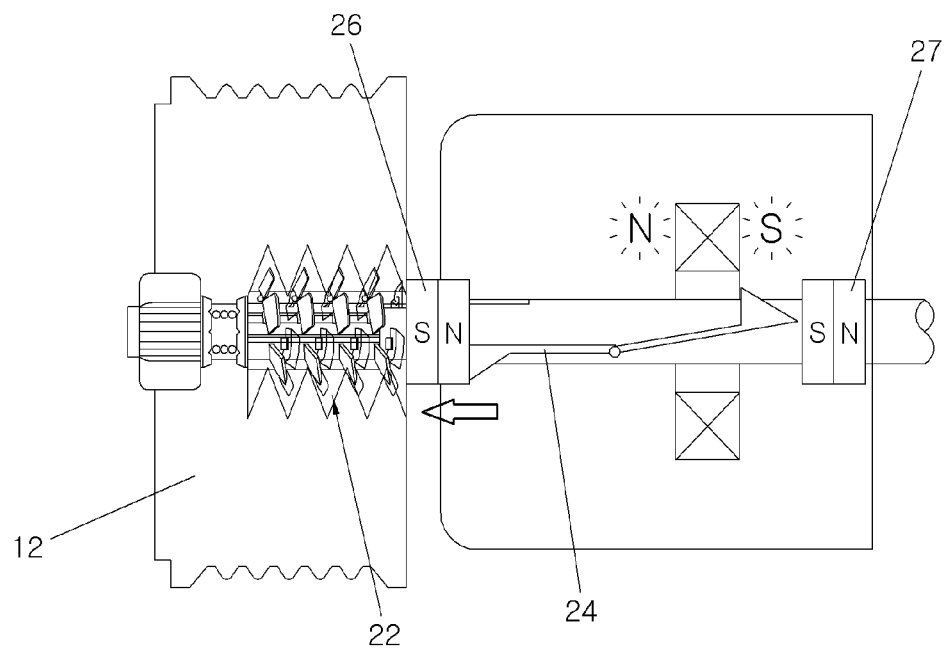
Figure 10A:
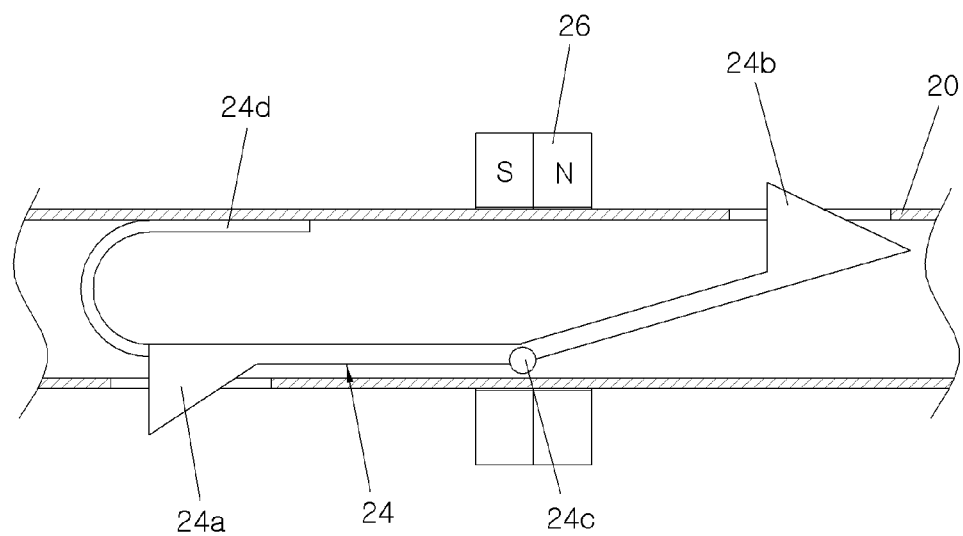
FIGS. 10A to 10C are cross-sectional views illustrating states of the screw thread retaining hook while the clutch is engaged in the clutch for an air conditioner compressor having the rotating shaft assembly having the deployable screw thread according to an exemplary embodiment of the present invention.
Figure 10B:
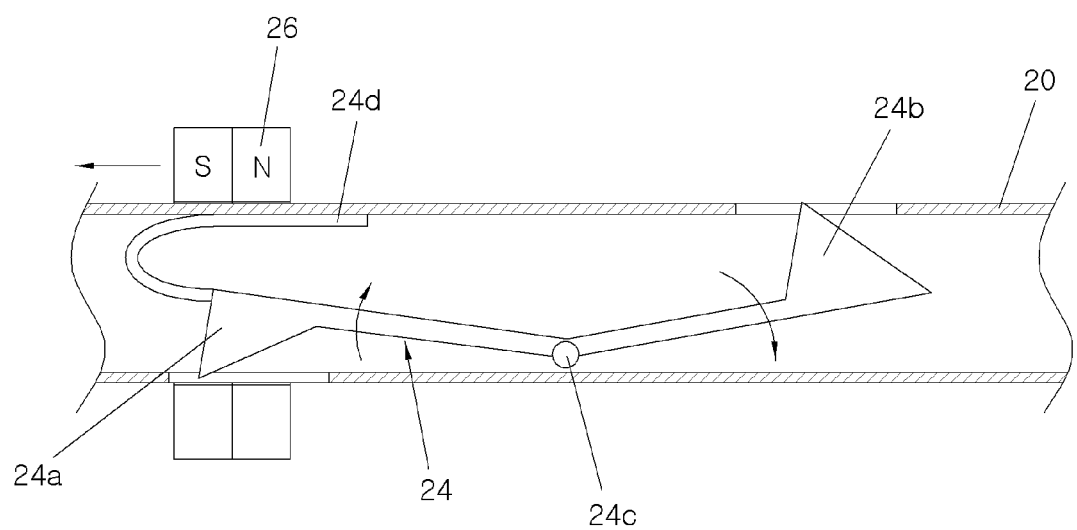
Figure 10C:
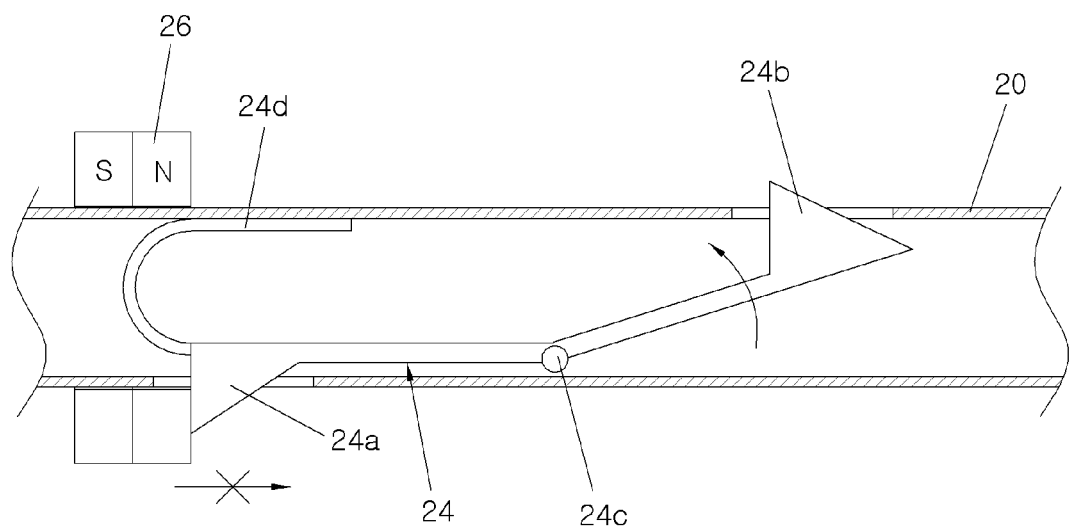

An operation of the clutch for an air conditioner compressor having the rotating shaft assembly having the deployable screw thread according to the present invention, which is configured as described above, will be described below. FIGS. 9A to 9C illustrate a process in which the clutch for an air conditioner compressor is engaged, and FIGS. 10A to 10C illustrate states of the screw thread retaining hook 24 while the clutch for an air conditioner compressor is engaged.

It is not necessary to transmit power of the engine to the compressor 2 before the air conditioner is operated, and as a result, the screw units 22 may be withdrawn from the interior of the driven pulley 12 (see FIG. 9A). Since the driven pulley 12 and the screw units 22 are not fastened together, driving power of the engine 1 is not transmitted to the screw units 22 from the driven pulley 12 even though the driving power of the engine 1 is transmitted to the driven pulley 12 through a belt 13, and as a result, the rotating shaft 20 may not be rotated, and thus the compressor 2 may also not be operated. In particular, the screw thread retaining hook 24 may remain in the state as illustrated in FIG. 10A.

FIG. 9B illustrates a state at the moment when the air conditioner begins to operate. When the occupant in the vehicle pushes or otherwise engages an air conditioner operating button or input or a temperature in the interior of the vehicle increases to be greater than a preset temperature, electric power may be applied to the coil 25. When the electric power is applied to the coil 25, the coil 25 may be magnetized. In particular, the electric power applied to the coil 25 may be applied so that repulsive force is applied between the first magnet 26 and the second magnet 27. For example, when the first magnet 26 and the second magnet 27 are installed to have a configuration of "S-pole-N-pole", the coil 25 may be magnetized to also have the configuration of "S-pole-N-pole". When the coil 25 is magnetized, the repulsive force may be applied between the coil 25 and the first magnet 26 and between the coil 25 and the second magnet 27, such that the first and second magnet 26 and 27 are about to move away from the coil 25.

When the first magnet 26 slides on the rotating shaft 20 away from the coil 25, the first magnet 26 may move toward the front ends of the screw units 22, thereby compressing the screw units 22. In other words, when the first magnet 26 moves toward the screw unit 22 and then comes into contact with the screw unit 22 positioned at the foremost side, the deployable portions 22b may be deployed and moved together with the first magnet 26. The slider 22a of the screw unit 22 positioned at the foremost side comes into contact with the deployable portion 22b of the second screw unit 22, thereby deploying the deployable portion 22b of the second screw unit 22. As this process is repeated, the deployable portions of all of the screw units 22 installed on the rotating shaft 20 may be deployed, as illustrated in FIG. 9B. When the deployable portions of all of the screw units 22 are deployed, the deployable portions 22b operate as a screw thread.

When the electric power is continuously applied to the coil 25, the first magnet 26 may insert the screw units 22 into the fastening groove 12a to fasten the driven pulley 12 and the screw units 22 to one another (see FIG. 9C). The first magnet 26 may pass over the screw thread retaining hook 24 when the first magnet 26 deploys the screw units 22 as the electric power is applied to the coil 25 and the repulsive force is applied. However, when a supply of electric power to the coil 25 is cut off, the first magnet 26 is unable return back to the original position due to the screw thread retaining hook 24, and the first magnet 26 may support the screw units 22, thereby allowing the screw units 22 to remain deployed.

When the first magnet 26 moves away from the coil 25, the first magnet 26 may pass over the catching protrusion 24a of the screw thread retaining hook 24. The first magnet 26 may pass over the inclined surface of the catching protrusion 24a while the first magnet 26 passes over the catching protrusion 24a. However, the screw thread retaining hook 24 may return back to an original position after the first magnet 26 passes over the catching protrusion 24a, and thus, the stopping surface of the catching protrusion 24a may be directed toward the first magnet 26. In particular, when a supply of electric power to the coil 25 is cut off, the first magnet 26 may be unable to return back to the original position by being caught by the stopping surface of the catching protrusion 24a even though the first magnet 26 is about to return back to the original position, and the first magnet 26 supports the screw units 22 as it is, thereby allowing the screw units 22 to remain deployed.

Meanwhile, since the movement of the second magnet 27 may be restricted by the housing, the second magnet 27 may be prevented from moving away from the coil 25 even though the repulsive force is applied between the coil 25 and the second magnet 27. When the driven pulley 12 and the screw units 22 are fastened to one another as described above, rotational force of the engine, input to the driven pulley 12, may be transmitted to the compressor 2, and thus, the air conditioner may be operated.

In addition, fastening of the driven pulley 12 and the screw units 22 together may be maintained even though a supply of electric power to the coil 25 is cut off, and as a result, it is not necessary to maintain a supply of electric power to transmit rotational force from the driven pulley 12 to the compressor 2. Therefore, it is not necessary to apply electric power during the operation of the air conditioner, thereby improving fuel economy of the vehicle by reducing electric power consumption for the vehicle.

When the air conditioner is requested to be stopped, electric current may be applied to the coil 25 in a reverse direction, and thus, the screw units 22 may be unfastened from the driven pulley 12. When the electric current is applied to the coil 25 in a direction opposite to the direction in which electric current is applied to fasten the driven pulley 12 and the screw units 22, attractive force may be applied between the coil 25 and the first magnet 26 and between the coil 25 and the second magnet 27 on the contrary to when the driven pulley 12 and the screw units 22 are fastened to one another.

Since the first magnet 26 is caught by the screw thread retaining hook 24, the first magnet 26 may be prevented from moving toward the coil 25 even though the attractive force is applied between the coil 25 and the first magnet 26, and as a result, the state illustrated in FIG. 9C may be maintained continuously maintained. However, when the attractive force is applied between the coil 25 and the second magnet 27, the second magnet 27 may push the releasing protrusion 24b of the screw thread retaining hook 24 while moving toward the coil 25. Since a surface of the releasing protrusion 24b, which faces the second magnet 27, is formed as an inclined surface, the releasing protrusion 24b may be pushed by the second magnet 27.

Figure 11A:
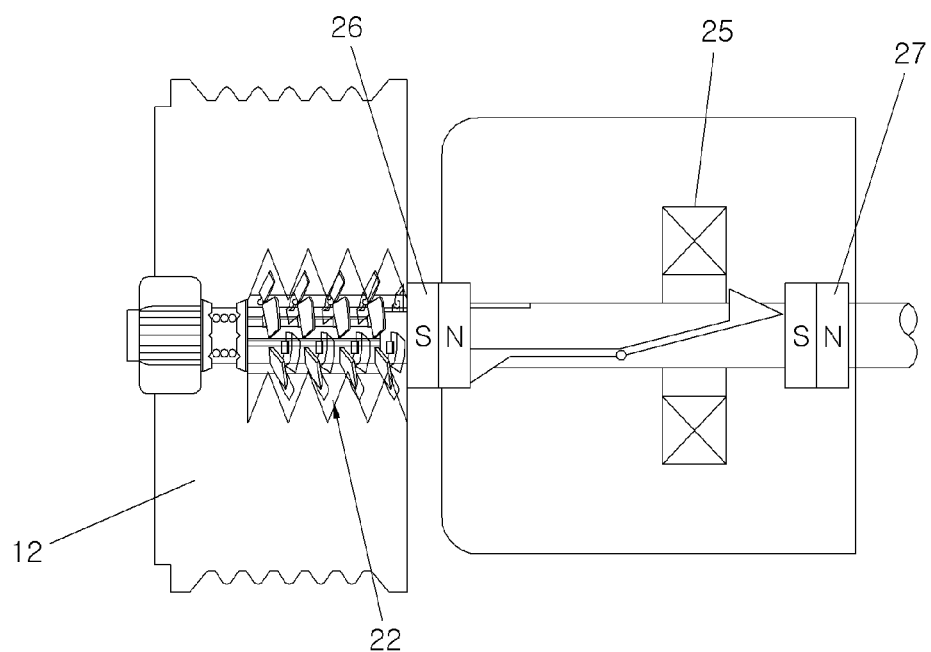
FIGS. 11A to 11C are schematic views illustrating a process in which the clutch for an air conditioner compressor having the rotating shaft assembly having the deployable screw thread according to an exemplary embodiment of the present invention is disengaged.
Figure 11B:
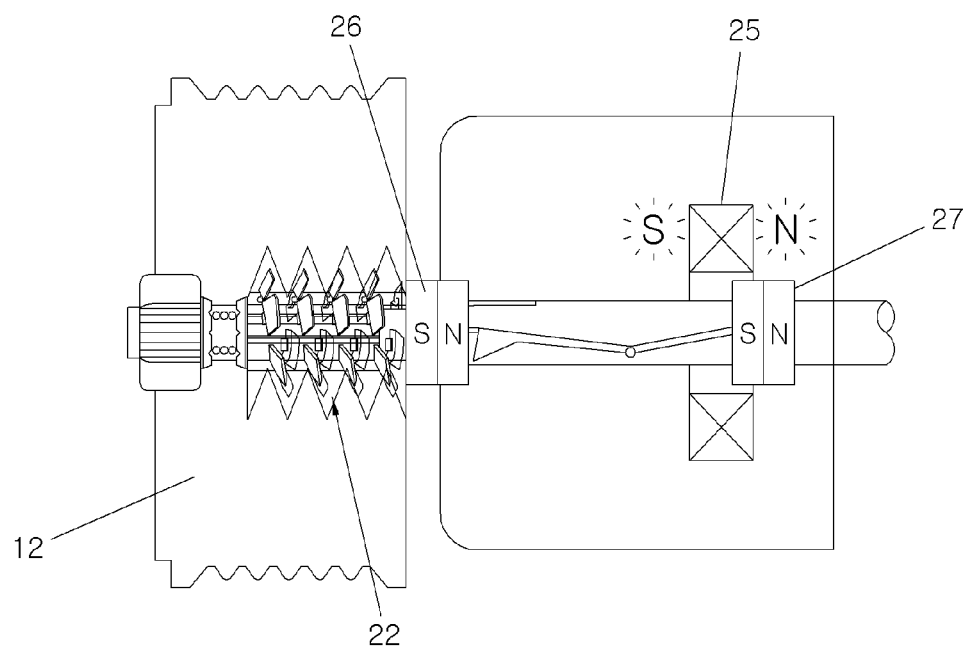
Figure 11C:
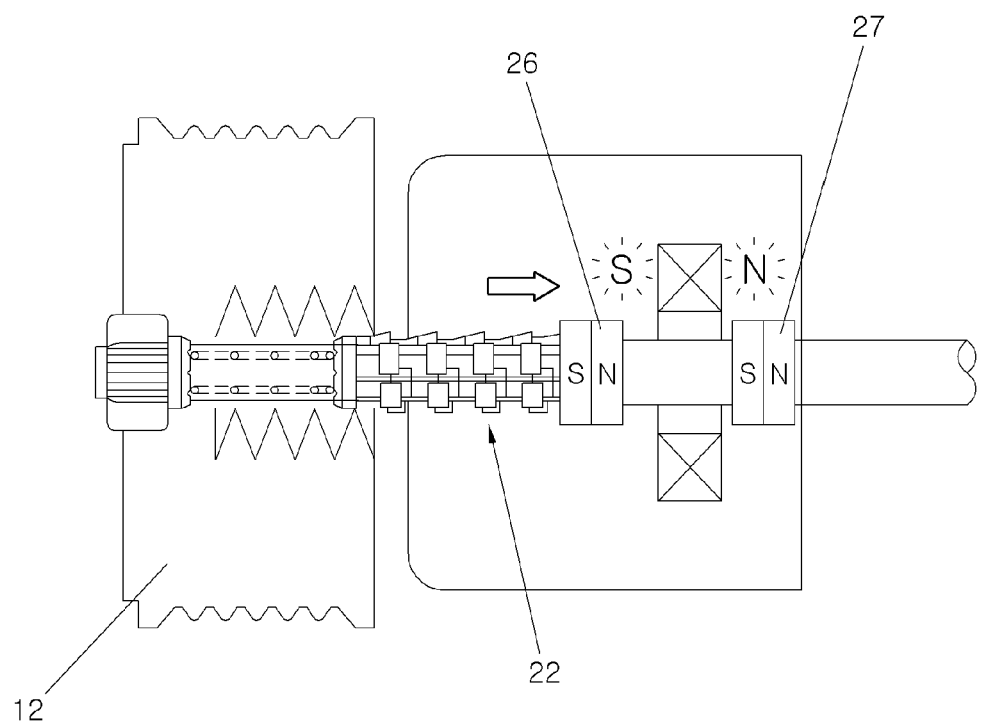
Figure 12A:
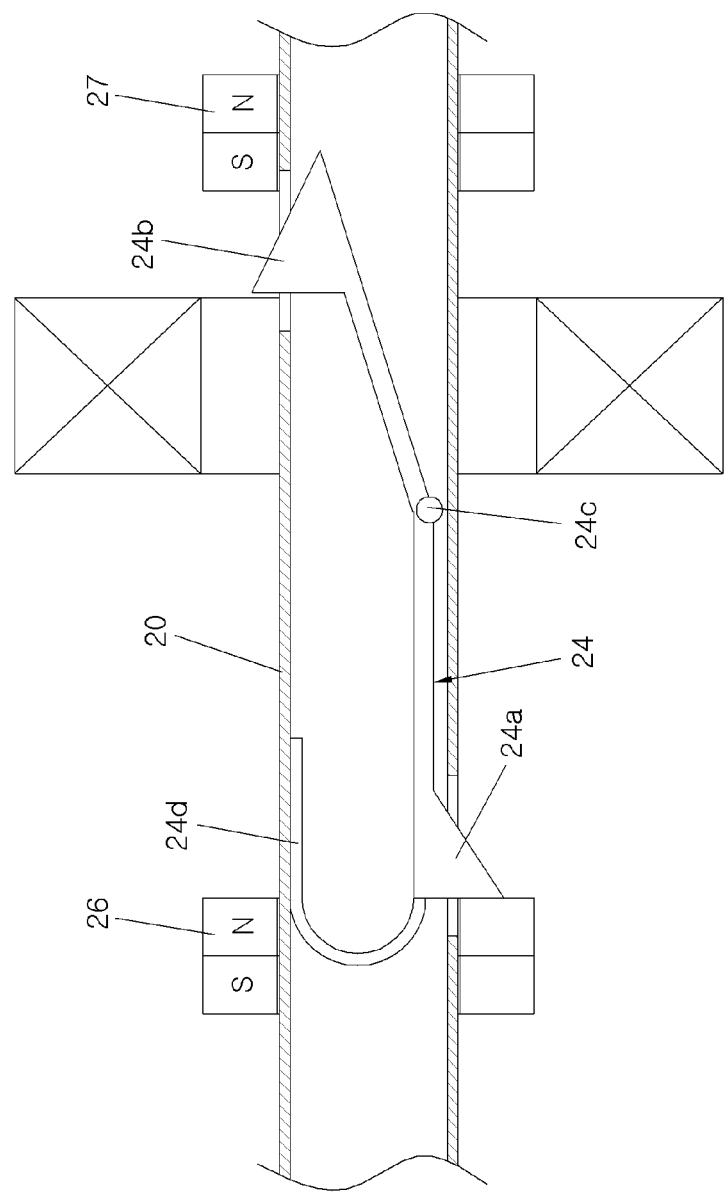

Further, when the releasing protrusion 24b is pushed, the screw thread retaining hook 24 may be rotated, and the catching protrusion 24a may be inserted into the rotating shaft 20 (see FIG. 11B). When the catching protrusion 24a is inserted into the rotating shaft 20 as described above, the screw thread retaining hook 24 may be unable to restrict the movement of the first magnet 26 any further. In particular, the spring 23 may elastically support and push the screw units 22 and the first magnet 26 in a direction opposite to a coupling direction. The screw units 22 may be folded again before the screw units 22 are deployed, and the first magnet 26 may return back to the initial position (see FIGS. 11C and 12B). Electric power may be applied to the coil 25 at the initial operating state even while the screw units 22 are unfastened from the driven pulley 12.

As described above, it is not necessary to continuously maintain a supply of electric power to transmit power to the compressor to operate the air conditioner during the operation of the air conditioner, and thus, it is not necessary to consume electric power to maintain the state in which power transmission is enabled to operate the air conditioner, and as a result, it may be possible to improve fuel economy of the vehicle.

What is claimed is:

1. A rotating shaft assembly having a deployable screw thread, comprising:
   a rotating shaft configured to transmit rotational force; and
   a plurality of screw units slidable in a longitudinal direction of the rotating shaft, and having deployable portions moved away from the rotating shaft when the deployable portions are pressed from one side by a pressing device,
   wherein the deployable portions are deployed outward when the screw units are pressed by the pressing device that moves along the rotating shaft, and
   wherein a spring is disposed at a side of the rotating shaft opposite to the pressing device, and the spring elastically supports the screw units to allow the screw units to return back to an initial position.

2. The rotating shaft assembly of claim 1, wherein the screw unit further includes:
   a connecting portion configured to slide along the rotating shaft; and
   a plurality of sliders disposed at predetermined intervals along a circumference of the connecting portion and each having a front end to which a rear end of the deployable portion is hingedly connected, and
   when the screw units are pressed by the pressing device, a rear end of the slider of any one screw unit pushes a front end of the deployable portion of another screw unit adjacent to one screw unit at a rear side to deploy the deployable portion.

3. The rotating shaft assembly of claim 2, wherein the sliders, which are disposed along the circumference of the connecting portion, are connected to the connecting portion at different positions in a longitudinal direction of the sliders.

4. The rotating shaft assembly of claim 3, wherein the plurality of screw units is disposed in the longitudinal direction of the rotating shaft, and the front end of any one deployable portion abuts against the rear end of the slider of another adjacent screw unit.

5. The rotating shaft assembly of claim 3, wherein the plurality of screw units is disposed in the longitudinal direction of the rotating shaft, the adjacent screw units are disposed to dispose the deployable portions at a predetermined angle interval, and when all of the deployable portions are deployed, an imaginary line, which connects end portions of the deployable portions, is a spiral line.

6. The rotating shaft assembly of claim 2, wherein a guide groove is formed in an outer surface of the rotating shaft in the longitudinal direction of the rotating shaft, and a guide protrusion, which is inserted into the guide groove, is formed on an inner surface of the connecting portion.

7. The rotating shaft assembly of claim 1, wherein the spring is wound outside the rotating shaft.

8. The rotating shaft assembly of claim 1, wherein the pressing device is a magnet which is installed to be movable along the rotating shaft, and configured to compress the screw units while moving along the rotating shaft when a magnetic field is applied.

9. A clutch for an air conditioner compressor, comprising:
a pulley to which rotational force is input from an engine;
an air conditioner compressor configured to compress a refrigerant when the rotational force is input from the pulley;
a rotating shaft assembly having a rotating shaft configured to transmit the rotational force to the compressor, and a plurality of screw units slidable in a longitudinal direction of the rotating shaft and having deployable portions spaced apart from the rotating shaft;
a coil installed in the compressor to surround the rotating shaft and magnetized when electric power is applied to operate the compressor; and
a first magnet installed to be slidable along the rotating shaft and configured to press the screw units when the coil is magnetized,
wherein a fastening groove in which the deployed rotating shaft assembly is accommodated is formed in the pulley, and
wherein when the coil is magnetized, the first magnet is configured to compress the screw units to deploy the deployable portions, and insert the screw units into the fastening groove to fasten the pulley and the rotating shaft assembly, to transmit the rotational force from the pulley to the compressor.

10. The clutch of claim 9, wherein the screw unit further includes:
a connecting portion that slides along the rotating shaft; and
a plurality of sliders disposed at predetermined intervals along a circumference of the connecting portion and each having a front end to which a rear end of the deployable portion is hingedly connected,
wherein when the screw units are pressed by the first magnet, a rear end of the slider of any one screw unit pushes a front end of the deployable portion of another screw unit adjacent to one screw at a rear side to deploy the deployable portion, to fasten the deployable portions to the fastening groove.

11. The clutch of claim 10, wherein the sliders, which are disposed along the circumference of the connecting portion, are connected to the connecting portion at different positions in a longitudinal direction of the sliders.

12. The clutch of claim 11, wherein the plurality of screw units is disposed in the longitudinal direction of the rotating shaft, the adjacent screw units are disposed to dispose the deployable portions at a predetermined angle interval, an imaginary line, which connects end portions of the deployable portions, is a spiral line when all of the deployable portions are deployed, and the rotating shaft assembly is fastened to the fastening groove of the pulley by a threaded engagement.

13. The clutch of claim 10, wherein a guide groove is formed in an outer surface of the rotating shaft in the longitudinal direction of the rotating shaft, and a guide protrusion, which is inserted into the guide groove, is formed on an inner surface of the connecting portion.

14. The clutch of claim 9, wherein a spring is installed in the fastening groove to be wound outside the rotating shaft when a first end of the spring is supported inside the fastening groove, and a second end of the spring supports the screw units in a direction in which the screw units are restored.

15. The clutch of claim 9, wherein the rotating shaft is formed as a hollow shaft, and a screw thread retaining hook is installed in the rotating shaft to support the first magnet and prevent the first magnet from being moved backward when the first magnet slides to compress the screw units.

16. The clutch of claim 15, wherein the screw thread retaining hook includes:
a catching protrusion inserted into the rotating shaft when the first magnet slides by the coil along the rotating shaft to compress the screw units, the catching protrusion remaining in a state of protruding from the rotating shaft in the opposite direction to maintain a state in which the first magnet compresses the screw units;
a rotating pin formed at a portion that extends from the catching protrusion and allows the screw thread retaining hook to rotate in the rotating shaft; and
an elastic portion which extends from the catching protrusion opposite to the rotating pin and elastically supports the catching protrusion so that the catching protrusion protrudes from the rotating shaft.

17. The clutch of claim 16, wherein a releasing protrusion, configured to rotate the catching protrusion to insert the catching protrusion into the rotating shaft when the air conditioner is requested to be stopped, is formed on the screw thread retaining hook at a side opposite to the catching protrusion based on the rotating pin.

18. The clutch of claim 17, further comprising:
a second magnet, which slides along the rotating shaft to press the releasing protrusion to insert the releasing protrusion into the rotating shaft when the air conditioner is requested to be stopped, is formed on the rotating shaft at a side opposite to the first magnet based on the coil.

19. The clutch of claim 18, wherein the second magnet is disposed to have the same polarity as the first magnet.

20. The clutch of claim 19, wherein when the air conditioner is requested to be stopped, electric current is applied to the coil in a direction opposite to a direction in which electric current is applied to deploy the screw units, the second magnet moves toward the first magnet to push the releasing protrusion and rotate the screw thread retaining hook, the catching protrusion is accommodated in the rotating shaft, and the first magnet is folded in an initial state.

* * * * *